United States Patent [19]

Shimamura et al.

[11] Patent Number: 4,508,009
[45] Date of Patent: Apr. 2, 1985

[54] BRAKE POWER SERVO BOOSTER

[75] Inventors: Morihiko Shimamura; Shintaro Uyama, both of Saitama, Japan

[73] Assignee: Jidosha Kiki Co., Ltd., Tokyo, Japan

[21] Appl. No.: 515,424

[22] Filed: Jul. 20, 1983

[30] Foreign Application Priority Data

Jul. 20, 1982 [JP] Japan .......................... 57-109864[U]

[51] Int. Cl.³ .............................................. F15B 9/10
[52] U.S. Cl. .................................. 91/376 R; 91/369 A
[58] Field of Search ............ 91/369 A, 369 B, 369 R, 91/376 R

[56] References Cited

U.S. PATENT DOCUMENTS 3,082,744  3/1963  Gardner ............................. 91/369 A
3,312,147  4/1967  Reichard ........................... 91/369 A
4,358,990  11/1982 Takeuchi ........................... 91/369 A Primary Examiner—Paul E. Maslousky
Attorney, Agent, or Firm—Sughrue, Mion, Zinn, Macpeak & Seas

[57] ABSTRACT

A brake power servo booster including a stationary stop provided on the cylindrical projection of a rear shell, and a movable stop provided on an input shaft connected between a brake pedal and a valve mechanism, and operationally associated with the stationary stop to restrict the retracted position of the input shaft. An intermediate stop member is slidably provided in the cylindrical projection, and has its retraction restricted by the stationary stop. The input shaft extends slidably through the intermediate stop member. The movable stop is adapted for abutment on the intermediate stop member to restrict the retracted position of the input shaft.

10 Claims, 3 Drawing Figures

BRAKE POWER SERVO BOOSTER

BACKGROUND OF THE INVENTION

1. Field of the Invention

This invention relates to a brake power servo booster. More particularly, it is concerned with a brake power servo booster in which a movable stop provided on an input shaft is caused to abut on a stationary stop provided in the cylindrical projection of a rear shell to restrict the retracted position of the input shaft.

2. Description of the Prior Art

There is known a brake power servo booster having a stationary stop and a movable stop which restrict the retracted position of an input shaft to reduce or eliminate the ineffective stroke of the input shaft during the initial period of booster operation. The input shaft is connected to a brake pedal by a coupling which is usually called a clevis. In order to minimize the space for the installation of the booster in an engine room, it is desirable to shorten the input shaft and allow the coupling to move into the cylindrical projection of a rear shell as the input shaft advances during the operation of the booster. This requires a sufficiently large space in the cylindrical projection to admit the coupling which is considerably large. The stationary stop, which is provided in the cylindrical projection, has to be disposed radially outwardly of the space for the coupling. It is necessary to enlarge accordingly the diameter of the movable stop which is provided on the input shaft.

The input shaft is swingable in accordance with the arcuate motion of the brake pedal. The angle of the input shaft in its swung position to the axis of the cylindrical projection depends slightly on any error in the positioning of the booster on the vehicle body, the position at which the input shaft is coupled to the brake pedal, or any change in that position resulting from the adjustment of play on the brake pedal. This variation in the angle has an effect on the relative positions of the stationary and movable stops, especially when the movable stop has an enlarged diameter. An increase in the diameter of the movable stop brings about a greater displacement of its outer periphery along the axis of the input shaft when it is swung. This displacement has an adverse effect on the position to which the movement of the input shaft is restricted by the abutment of the movable stop on the stationary stop.

SUMMARY OF THE INVENTION

It is an object of this invention to provide a brake power servo booster which includes a movable stop having a satisfactorily small diameter, and a stationary stop through which a coupling connecting an input shaft to a brake pedal can advance into the cylindrical projection of a rear shell.

According to this invention, an intermediate stop member is slidably provided in the cylindrical projection of the rear shell, and slidable into abutment on the stationary stop whereby any further rearward movement thereof is restricted. The input shaft extends slidably through the intermediate stop member. The movable stop on the input shaft is movable into abutment on the intermediate stop member to restrict any further retraction of the input shaft. By virtue of the intermediate stop member, the diameter of the movable stop is not limited by that of the stationary stop, but is sufficiently small to ensure a proper retracted position for the input shaft, to what angle it may be swung.

DETAILED DESCRIPTION OF THE INVENTION

Figure 1:
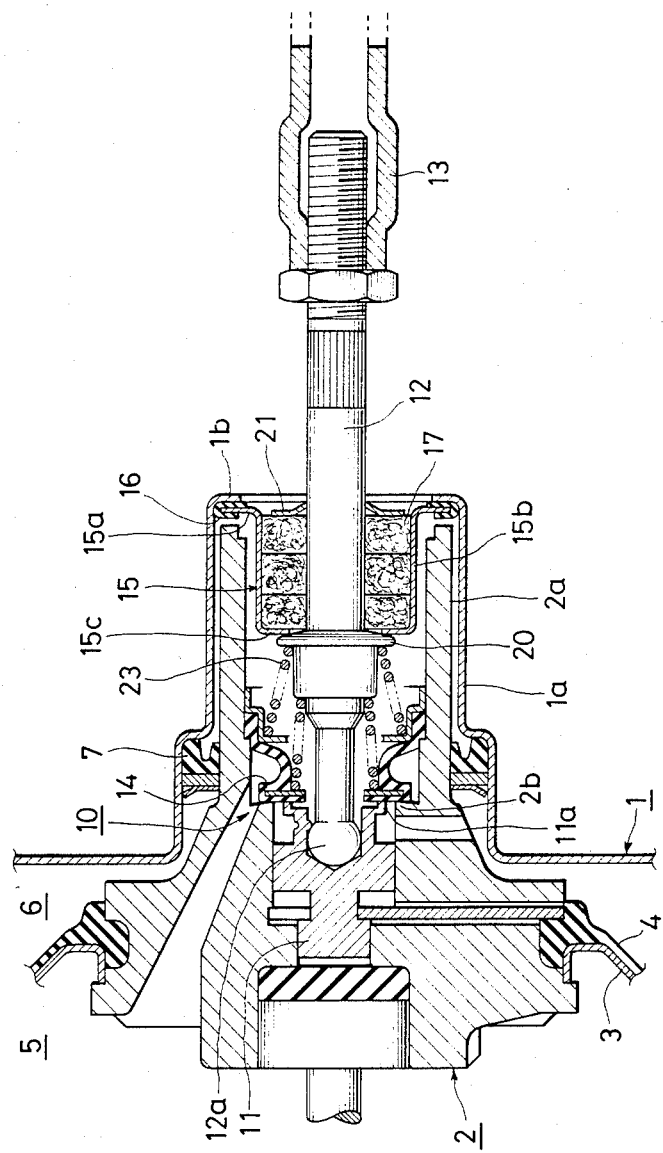
FIG. 1 is a longitudinal sectional view of a brake power servo booster embodying this invention.

Referring to FIG. 1 of the drawings, a rear shell 1 and a front shell not shown define a closed housing in which a valve body 2 is disposed. A power piston 3 is integral with the valve body 2. A diaphragm 4 divides the housing into a negative pressure chamber 5 and an atmospheric pressure chamber 6, as is well known in the art. A cylindrical projection 1a extends outwardly from the rear shell 1, and has an inwardly bent end which defines a stationary stop 1b. The cylindrical projection 1a may form an integral or separate part of the rear shell 1. The valve body 2 has a cylindrical portion 2a extending axially into the cylindrical projection 1a, and is slidable through a sealing member 7 disposed in a shoulder formed in substantially the mid-portion of the cylindrical projection 1a.

The valve body 2 comprises a valve mechanism 10 including a valve plunger 11. An input shaft 12 has a spherical end 12a connected rotatably to the valve plunger 11. A coupling 13 is threadedly connected to the other end of the input shaft 12 to connect it to a brake pedal not shown. The valve mechanism 10 is of the well-known construction, and includes a valve member 14 which is engageable with, or disengageable from a valve seat 11a formed on the plunger 11, and a valve seat 2b on the valve body 2 to change over a path of fluid through the valve.

According to a salient feature of this invention, a cup-shaped intermediate stop member 15 is provided in the cylindrical projection 1a. The stop member 15 has a radially outwardly extending flange 15a provided with an elastic member 16 which is in slidable contact with the inner surface of the cylindrical projection 1a. The stop member 15 is slidable in the cylindrical projection 1a, and its rearward movement, to the right in FIG. 1, is restricted by the stationary stop 1b. The stop member 15 has a cup-shaped main body 15b disposed within the cylindrical portion 2a of the valve body 2. A flexible air filter 17, which has usually been provided in the cylindrical portion 2a, is disposed within the main body 15b.

The input shaft 12 extends through the stop member 15 and the air filter 17. A movable stop 20 is disposed between the stop member 15 and the valve mechanism 10, and forms an integral or a separate part relative to the input shaft 12. The movable stop 20 has a spherical surface contacting the end surface 15c of the intermediate stop member 15, and forming a part of an imaginary sphere having its center on the spherical end 12a of the input shaft 12. A retainer 21 is resiliently secured about the input shaft 12 to hold the air filter 17 within the stop member 15.

If the brake pedal is worked to advance the input shaft 12, the valve member 14 is disengaged from the valve seat 11a to connect the atmospheric pressure chamber 6 with the open air. A difference of pressure is created between the opposite sides of the diaphragm 4, and causes the valve body 2, the power piston 3 and the input shaft 12 to advance together. The intermediate stop member 15 and the air filter 17 also advance through the cylindrical projection 1a with the input shaft 12. As the input shaft 12 advances, the coupling 13 moves into the cylindrical projection 1a. The stationary stop 1b has a sufficiently large inside diameter to enable the coupling 13 to move into the cylindrical projection 1a without interfering with the stationary stop 1b.

If the brake pedal is set free, the valve member 14 engages the valve seat 11a by a spring 23 to disconnect the atmospheric pressure chamber 6 from the open air, and the valve member 14 is disengaged from the valve seat 2b to connect the negative pressure chamber 5 and the atmospheric pressure chamber 6. The difference of pressure between the opposite sides of the diaphragm 4 becomes smaller, and a return spring not shown causes the valve body 2, the power piston 3 and the input shaft 12 to retract together, while at the same time, the intermediate stop member 15 is retracted by the movable stop 20 of the input shaft 12.

The retraction of the stop member 15 is terminated upon abutment of the elastic member 16 on the stationary stop 1b. The retraction of the input shaft 12 is terminated upon abutment of the movable stop 20 on the end surface 15c of the stop member 15. The retraction of the valve body 2 is still continued by the return spring, and if the clearance between the valve seat 2b on the valve body 2 and the valve member 14 is reduced to nearly zero, the movement of the valve body 2 is terminated, while a difference of pressure counterbalancing the force of the return spring is left between the opposite sides of the diaphragm 4.

If the brake pedal is, then, worked to advance the input shaft 12, the valve mechanism 10 functions immediately to introduce air into the atmospheric pressure chamber 6. Therefore, the ineffective stroke, or movement of the input shaft 12 before the functioning of the valve mechanism 10 can be reduced or eliminated.

Figure 2:
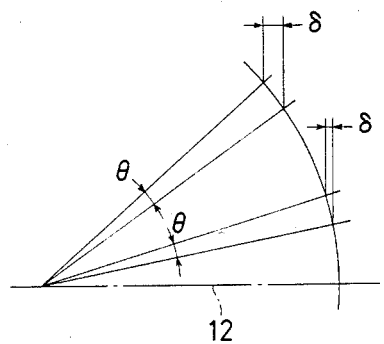
FIG. 2 is a view showing the effects of swinging of the input shaft.

As is obvious from the foregoing description, the presence of the intermediate stop member 15 enables the diameter of the movable stop 20 to be considerably small, while the stationary stop 1b has a sufficiently large inside diameter to prevent any interference of the coupling 13. A smaller diameter of the movable stop 20 means a smaller amount of axial displacement ($\delta$) thereof when the input shaft 12 is swung at a particular angle $\theta$, as is obvious from FIG. 2. Insofar as the movable stop 20 has a spherical surface adapted to contact the intermediate stop member 15, it may be theoretically true that there is no axial displacement of the movable stop 20 even if it has a large diameter. It is, however, advisable to form the movable stop 20 with a smaller diameter, since it is difficult to form a regular spherical surface having its center on the center of swinging of the input shaft 12. Moreover, as the intermediate stop member 15 is cup-shaped to have its end surface 15c approach the center of swinging of the input shaft 12, the input shaft is swung more slightly from axis when it is swung at a maximum angle, than in the event it is farther apart from the center of swinging of the input shaft. This feature also enables a reduction in the diameter of the movable stop 20.

Figure 3:
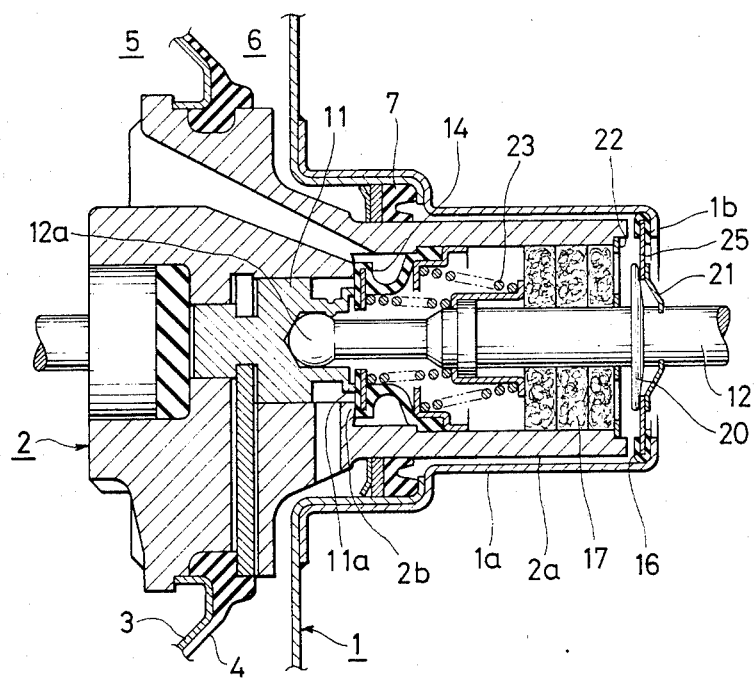
FIG. 3 is a longitudinal sectional view of another embodiment of this invention.

Referring now to FIG. 3, another embodiment of this invention includes an intermediate stop member 25 in the shape of an annular plate which is as effective as the cup-shaped member shown in FIG. 1. An elastic member 16 is likewise provided along the outer periphery of the stop member 25, and a movable stop 20 has a spherical surface contacting the inner periphery of the stop member 25. The stop member 25 is swingably held between the movable stop 20 and a retainer 21. An air filter 17 is held by a retainer 22 within the cylindrical portion 2a of the valve body 2. The booster of FIG. 3 is otherwise identical in construction to that of FIG. 1. No further description is made, since like parts are shown by like numerals throughout FIGS. 1 and 3.

The booster of FIG. 3 works equally to that of FIG. 1, though the movable stop 20 is spaced a greater distance from the center of swinging of the input shaft 12.

Although the invention has been described with reference to the preferred embodiments thereof, further modifications or variations may be possible by anybody of ordinary skill in the art. For example, it is possible to form the intermediate stop member with a spherical surface which is complementary to the spherical surface of the movable stop. Alternatively, it is possible to form a spherical surface only on the intermediate stop member. As the elastic member 16 is primarily provided for damping noise and protecting the sealing member 7 against dust, it may be more effective to provide it with a lip, or form it with a different cross sectional shape which may be more suitable. On the contrary, however, it may be possible to eliminate the elastic member under certain circumstances. The retainer 21 can also be eliminated, and while the movable stop is formed with a pair of opposite spherical surfaces, the intermediate stop member can be formed with a pair of spherical surfaces holding the movable stop therebetween to serve as a retainer therefor.

What is claimed is:

1. In a brake power servo booster including a stationary stop provided on a cylindrical projection of a rear shell, and a movable stop provided on an input shaft connected between a brake pedal and a valve mechanism, and operationally associated with said stationary stop to restrict a retracted position of said input shaft, the improvement which comprises an intermediate stop member disposed in said cylindrical projection to be slidable relative to said cylindrical member in the axial direction of said shaft during operation of said shaft, and having its retraction restricted by said stationary stop, said input shaft extending slidably through said intermediate stop member, said movable stop being adapted for abutment on said intermediate stop member to restrict said retracted position of said input shaft.

2. A brake power servo booster as set forth in claim 1, wherein said intermediate stop member is cup-shaped, and has a radially outwardly extending flange slidably engaging the inner surface of said cylindrical projection, and an end surface remote from said flange, said movable stop contacting said end surface.

3. A brake power servo booster as set forth in claim 2, wherein said movable stop has a spherical surface contacting said end surface.

4. A brake power servo booster as set forth in claim 1, wherein said intermediate stop member comprises an annular plate having an outer periphery slidably engaging the inner surface of said cylindrical projection and an inner periphery contacting said movable stop.

5. A brake power servo booster as set forth in claim 4, wherein said movable stop has a spherical surface contacting said inner periphery of said annular plate.

6. A brake power servo booster as claimed in claim 1 wherein said stationary stop defines an opening in said cylindrical projection large enough to pass a coupling on said input shaft, and said movable stop is smaller than said opening.

7. A brake power servo booster as set forth in claim 6, wherein said intermediate stop member is cup-shaped, and has a radially outwardly extending flange slidably engaging the inner surface of said cylindrical projection, and an end surface remote from said flange, said movable stop contacting said end surface.

8. A brake power servo booster as set forth in claim 7, wherein said movable stop has a spherical surface contacting said end surface.

9. A brake power servo booster as set forth in claim 6, wherein said intermediate stop member comprises an annular plate having an outer periphery slidably engaging the inner surface of said cylindrical projection and an inner periphery contacting said movable stop.

10. A brake power servo booster as set forth in claim 9, wherein said movable stop has a spherical surface contacting said inner periphery of said annular plate.

* * * * *